United States Patent
Galos

(12) United States Patent (10) Patent No.: US 7,898,436 B2
Galos (45) Date of Patent: Mar. 1, 2011

(54) ON-VEHICLE POSITION DETECTION SYSTEM

(75) Inventor: Andreas Galos, Stuttgart (DE)

(73) Assignee: Alpine Electronics, Inc., Tokyo (JP)

( * ) Notice: Subject to any disclaimer, the term of this patent is extended or adjusted under 35 U.S.C. 154(b) by 305 days.

(21) Appl. No.: 12/136,494

(22) Filed: Jun. 10, 2008

(65) Prior Publication Data
US 2008/0309500 A1 Dec. 18, 2008

(30) Foreign Application Priority Data
Jun. 13, 2007 (EP) ................................ 07011594

(51) Int. Cl.
*G08G 1/123* (2006.01)
(52) U.S. Cl. .............................. 340/995.17; 340/995.1; 382/103
(58) Field of Classification Search ............ 340/995.17, 340/995.1, 995.14, 995.16, 995.11; 382/103
See application file for complete search history.

(56) References Cited

U.S. PATENT DOCUMENTS

| 7,035,440 B2 * | 4/2006 | Kaku | 382/103 |
| 7,084,859 B1 | 8/2006 | Pryor | |
| 7,098,812 B2 * | 8/2006 | Hirota | 340/995.1 |
| 2004/0036764 A1 | 2/2004 | Hirota | |
| 2005/0064936 A1 | 3/2005 | Pryor | |
| 2005/0276448 A1 | 12/2005 | Pryor | |

FOREIGN PATENT DOCUMENTS

| EP | 0 872 710 | 10/1998 |
| JP | 2006-243741 | 9/2001 |
| WO | 2006/049217 | 5/2006 |

* cited by examiner

*Primary Examiner*—John A Tweel, Jr.
(74) *Attorney, Agent, or Firm*—Brinks Hofer Gilson & Lione

(57) ABSTRACT

An on-vehicle position detection system includes a radiation emitting device for producing at least one beam which is appropriate to be reflected by a human body seated in the vehicle, a sensor device adapted for detecting the reflection of the at least one beam produced by the radiation emitting device and reflected by the human body, and for generating an output signal responsive to a reflection state of the at least one beam. A control device is coupled with the sensor device and is adapted for determining whether the output signal corresponds with a first value indicative of a first position of the human body, or a second value which is different from the first value and indicative of a second position of the human body. The control device is further adapted for switching on, switching off, or changing at least one of the functions of the operation mode of a device to be controlled when the control device determines that the output signal corresponds with the second value.

20 Claims, 3 Drawing Sheets a.

b.

ON-VEHICLE POSITION DETECTION SYSTEM

BACKGROUND OF THE INVENTION

RELATED APPLICATIONS

The present application claims priority to European Patent Application Number 07011594.4, filed Jun. 13, 2007, the entirety of which is hereby incorporated by reference.

1. Field of Invention

The present invention is directed to an on-vehicle position detection system which may particularly be implemented in a vehicle environment, for example in the vicinity of a driver's seat.

2. Description of Related Art

Entertainment or infotainment (entertainment and information) systems, such as audio or video systems, are available in many different configurations. For example, a typical automobile entertainment or infotainment system may include a head unit comprising a display system which is placed in front of or in the vicinity of the driver's seat, for example in the mid-console of the interior car environment. Such a display system commonly includes a display device including a display screen which may be used, for instance, in connection with a vehicle navigation system for displaying a map image, or which may be used for entertainment or infotainment purposes (e.g. TV or video applications).

In case that such a display screen is installed in the central head unit as described above, the display system may be capable of displaying a number of views in respective viewing regions, so that a first view may be displayed in a first viewing region of the display screen and a different second view may be displayed at the same time in a second viewing region of the display screen. Commonly, displays of this type are known as dual view displays. The display system may provide the driver of the vehicle with first information, such as navigation information, and may provide a passenger seated next to the driver with different information or entertainment, for example permitting the passenger to view a TV program or a video for entertainment purposes. As such, the display device of such a display system has an operation mode providing different functions, for example providing one of the functions to the driver and providing another function to the passenger, which functions may be provided in parallel in respective viewing regions (multiple view function). One embodiment of such a multiple view function is the dual view function as described above.

Generally, the individual contents of a dual view display are visible from a limited viewing angle. For example, a first viewing region of the display device is designed for displaying its content towards the driver's seat so that it is sufficiently visible from the driver's perspective, whereas the other viewing region is designed for displaying its content towards the passenger's seat so that the content displayed therein is sufficiently visible from the passenger's perspective. In such a configuration it may occur that it is not possible to view in sufficient quality the content of the passenger's viewing region of the display screen from the driver's perspective, i.e., from the driver's viewing angle, and vice versa. Such a configuration may be desirable for safety considerations, because it should not be possible for the driver to view the passenger's entertainment program displayed on the passenger's viewing region of the display screen during driving, thus decreasing the driver's distraction during driving.

However, situations may occur in which a driver of a vehicle nevertheless desires to watch the passenger's view displayed on the passenger's viewing region, which may only be possible if the driver leaves his normal driving position and leans over towards the passengers seat. Such behavior, however, may be dangerous as the driver is distracted from driving and may lose control of the vehicle during driving.

In JP 2006-243741 there is disclosed a display device which has a display part capable of displaying individual video images in two visual directions of a driver's seat and a passenger's seat on one screen. The display device further includes a mode switching means capable of selecting a first display mode for displaying the video image in both visual directions and a second display mode for displaying the video image in one visual direction and displaying a single color in the other visual direction.

BRIEF SUMMARY

It is therefore an object of the present invention to provide an on-vehicle position detection system which is capable of influencing a user's behavior, particularly a driver's behavior, in such a way that risky or hazardous behavior may be avoided.

According to one embodiment of the invention, an on-vehicle position detection system comprises a radiation emitting device for producing at least one beam which is appropriate to be reflected by a human body seated in the vehicle, and a sensor device which is adapted for detecting a reflection of the at least one beam produced by the radiation emitting device and reflected by the human body and for generating an output signal responsive to a reflection state of the at least one beam. A control device is coupled with the sensor device, wherein the control device is adapted for receiving the output signal from the sensor device and for determining whether the output signal corresponds with a first value indicative of a first position of the human body, or a second value which is different from the first value and which is particularly indicative of a second position of the human body different from the first position. The control device is further adapted for generating a control signal to be provided to a device to be controlled having at least one operation mode capable of providing different functions, the control signal adapted for switching on, switching off, or changing at least one of the functions of the operation mode when the control device determines that the output signal corresponds with the second value.

Particularly, when the radiation emitting device is adapted for directing at least one beam towards a driver's seat of a vehicle and the sensor device is adapted for detecting a reflection of the at least one beam reflected by the driver's body, the position detection system according to the invention is capable of detecting the driver's position or when the driver is leaving his or her normal position, particularly taking a position in which the driver is trying to watch the passenger's content displayed on a passenger's viewing region of a dual view display. When detecting such a situation, counter-measures can be activated by the control device of the position detection system, such as switching off or changing the content of the passenger's viewing region of a display screen. In this way, the driver no longer has any motivation to lean over to try to watch the content of the passenger's viewing region of the display screen. In this way, the driver's behavior may be influenced in a way that the driver's distraction during driving may be reduced because the driver may lose the motivation to lean over to watch the passenger's display contents.

Although particular effects and advantages of the present invention have been described with respect to a display system which is installed in a vehicle environment, the present invention may generally be applied to any type of on-vehicle system in which the sensor device and control device may be used for detecting a particular position of a person seated in the vehicle and for controlling certain functions of an operation mode of a device to be controlled according to the position of the user. In principle, the arrangement according to the invention may be used in any field for detecting whether or not a user is present in front of a device to be controlled such as a display screen, and for controlling at least one of multiple functions of the operation-mode of the device according to the present situation. A possible application may also be in the field of rear seat entertainment with the position detection system detecting a position of at least one passenger seated in one of the rear seats of a vehicle, such as a car, for controlling a system like an entertainment or infotainment system responsive to a passenger's position.

According to one embodiment of the invention, the radiation emitting device produces at least one infra-red beam. Further, the sensor device may include at least one photo sensor for detecting at least one reflected beam produced by the radiation emitting device. In this way, a reflective infra-red proximity sensor may be used as is generally known in the art. When being used in combination with an on-vehicle position detection system, a rather cost efficient and effective on-vehicle position detection system may be provided, particularly when compared to several types of known "out-of-position" detectors such as those used for airbag activation control, etc. When compared with reflective infra-red proximity sensors, such touch-based detectors are very complex and expensive sensors, and are typically arranged in the seats of a vehicle. Typical out-of-position detectors require a touch surface in the seats to evaluate the sitting posture of the human body, wherein such systems are very expensive and require connections between the respective seat and the control unit. On the other hand, the system according to the present invention can directly be applied to or installed in the device to be controlled, such as a display device, for achieving minimum complexity.

According to a further embodiment of the invention, the device to be controlled is a display device, such as a central head unit for displaying various information and/or entertainment. The operation mode of the display device includes displaying at least a first view (for instance, an image or a stream of images) in a first viewing region of a display screen, and at least a second view in a second viewing region of the display screen. The control device is adapted for switching on, switching off, or changing at least one of the first and second views when the control device determines that the output signal corresponds with the second value. For example, the first view may be switched to a blank screen or may be changed such that the first and second views are substantially the same. Therefore, when applied in a vehicle environment as discussed above, when the driver is trying to lean over to watch the passenger's display contents, the passenger's viewing region is switched to a blank screen or is changed such that the passenger's viewing region of the display screen displays the same view with the same content as in the driver's viewing region of the display screen.

According to another embodiment, the respective view may be switched to an idle image, for example displaying an image of a single color.

According to another embodiment of the invention, the sensor device is adapted for generating the output signal responsive to the degree of reflection of the at least one beam, wherein the control device defines at least one predetermined value and determines whether the output signal is below or above the predetermined value.

According to a further embodiment of the invention, the radiation emitting device may produce the at least one beam discontinuously at random time intervals, so that the user cannot anticipate when he or she is measured by the sensor device. Accordingly, the driver of a vehicle cannot predict an appropriate time for leaning over towards the passenger's seat to watch the respective display contents without being detected by the detection system.

Further advantageous features and embodiments of the invention are evident from the appended claims.

BRIEF DESCRIPTION OF THE DRAWINGS

The invention will now be explained in view of the accompanying drawings for illustrating various embodiments of the invention.

DETAILED DESCRIPTION OF THE PREFERRED EMBODIMENTS

Figure 1:
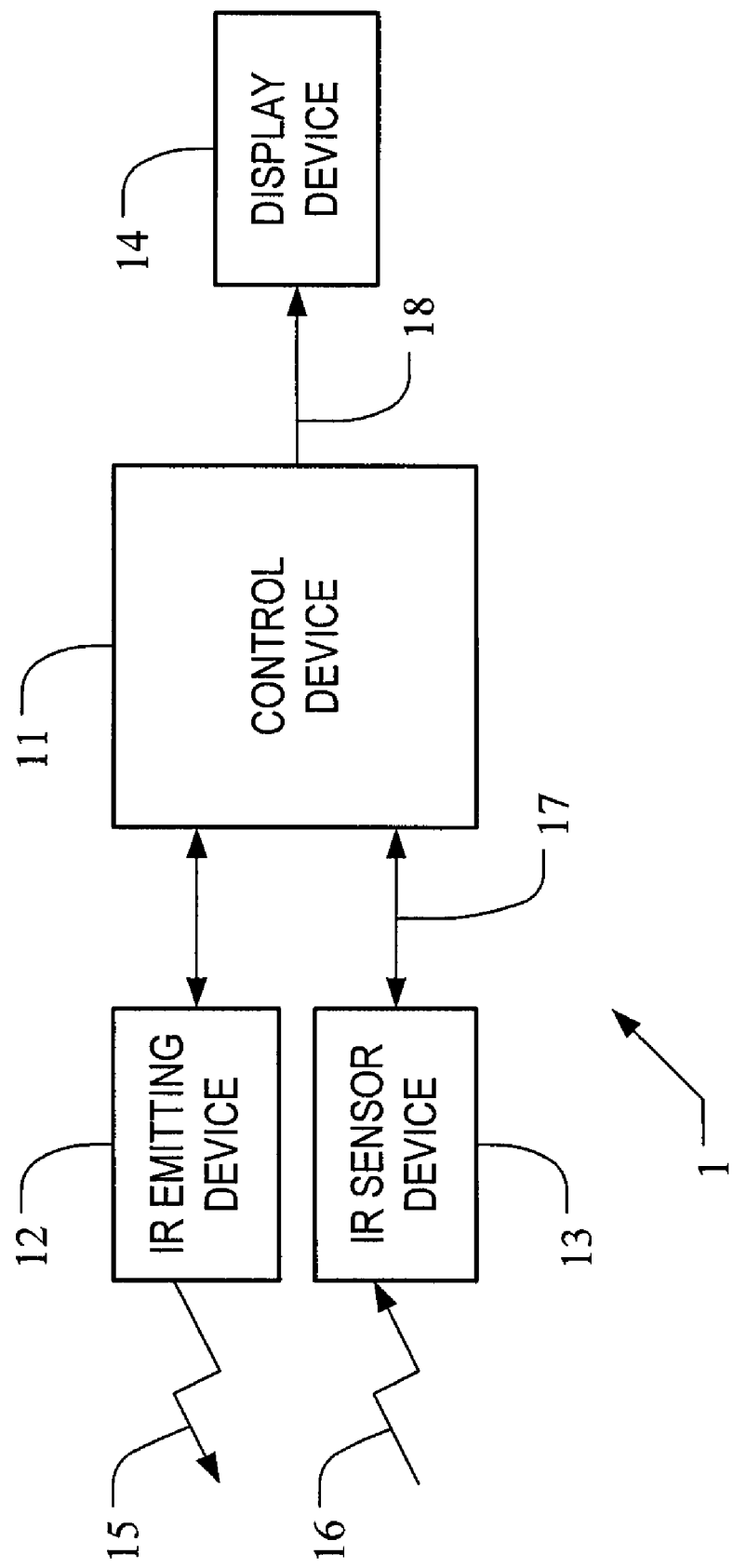
FIG. 1 is a schematic diagram illustrating an embodiment of a position detection system according to the invention controlling a display device installed in a vehicle.

FIG. 1 depicts a schematic diagram illustrating an embodiment of a position detection system according to the invention. In the present embodiment, the position detection system is installed in a display system 1 which comprises a display device 14 including a display screen and having a multiple view function for displaying multiple views (images or streams of images) in respective viewing regions at the same time on the display screen. For example, the display device 14 may include a dual view display as is commonly known.

The display system 1 further includes a radiation emitting device 12, which in the present example produces at least one infra-red beam 15. The display system 1 further includes a sensor device 13 which comprises at least one photo sensor for detecting at least one reflected beam 16 produced by the radiation emitting device 12 and reflected by a human body. Particularly, the infra-red beam 15 is directed towards a human body seated in a vehicle, wherein the sensor device 13 is adapted for detecting a reflection of the beam produced by the radiation emitting device 12, wherein such a reflected beam 16 reflected by the same human body is detected by an appropriate photo sensor of the sensor device 13. The sensor device 13 generates an output signal 17 responsive to a reflection state of the beam 15. In this way, the basic concept of a reflective infra-red proximity sensor is used in the context of the present invention. However, the person skilled in the art will appreciate that other reflective sensor technologies also may be applied in the context of the present invention, for example electromagnetic sensor technology using any kind of electromagnetic radiation.

The position detection system according to the present embodiment further includes a control device 11 coupled with the sensor device 13 and the display device 14, wherein the control device receives the output signal 17 from the sensor device 13. The control device 11 generates a control signal 18 to be provided to the display device 14 for controlling certain functions thereof, as outlined in more detail below.

Now referring to the illustration shown in FIG. 2, there are schematically depicted the display device 14 as well as the radiation emitting device 12 and the sensor device 13, generally referred to as infra-red sensor apparatus 12, 13 in the following. As further schematically shown in FIG. 2, the operation mode of the display device 14 includes a multiple view function, particularly a dual view function displaying a number of views at the same time which are visible in a respective one of viewing regions 141, 142 which may be separated or may be provided on a common screen. For example, a first image or stream of images may be displayed in the first viewing region 141 of the display screen, whereas a second image or stream of images may be displayed in the second viewing region 142 of the display screen. In this way, different users of the display system may watch different contents respectively displayed in the different viewing regions 141, 142.

In the present embodiment, the display system 1 as shown with reference to FIG. 1 is installed in a vehicle environment, thus forming an on-vehicle display system which may be installed in a central front console of the vehicle, for instance in a car. As such, the viewing region 141 is arranged for providing contents, such as a map view or other information content, to a driver 3 seated on the left hand side of the display device 14. On the other hand, the viewing region 142 is arranged for displaying contents, such as video or TV contents, to a passenger 4 seated on the right hand side of the vehicle. For example, the viewing regions 141, 142 may be arranged at different viewing angles directed towards the respective seats.

Figure 2:
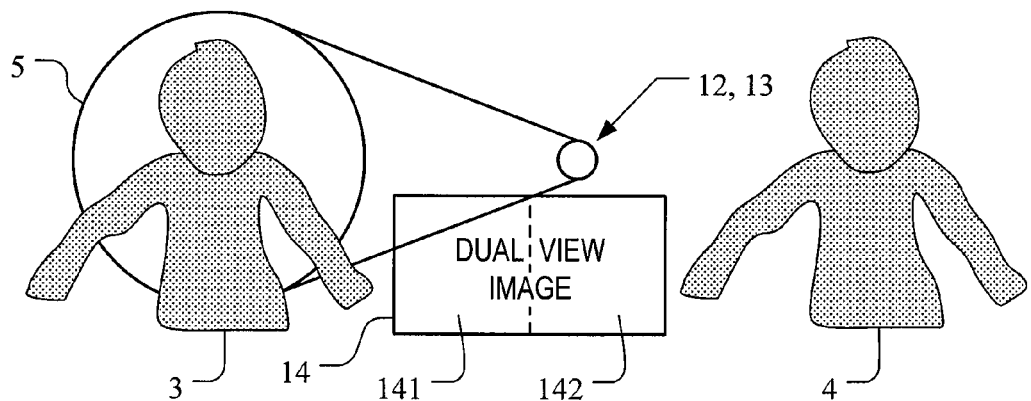
FIG. 2 is a schematic illustration of a display device and an arranged sensor of a position detection system for detecting a driver's position in a vehicle.
Figure 2:
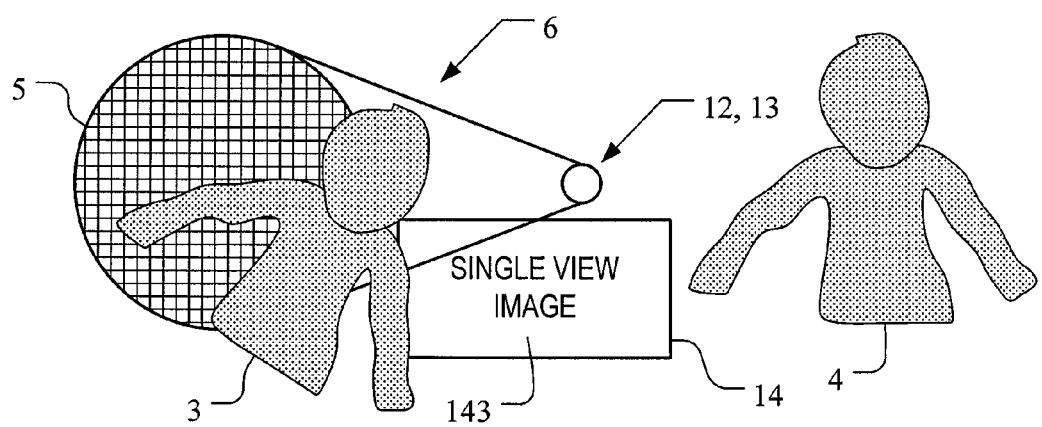
Figure 3:
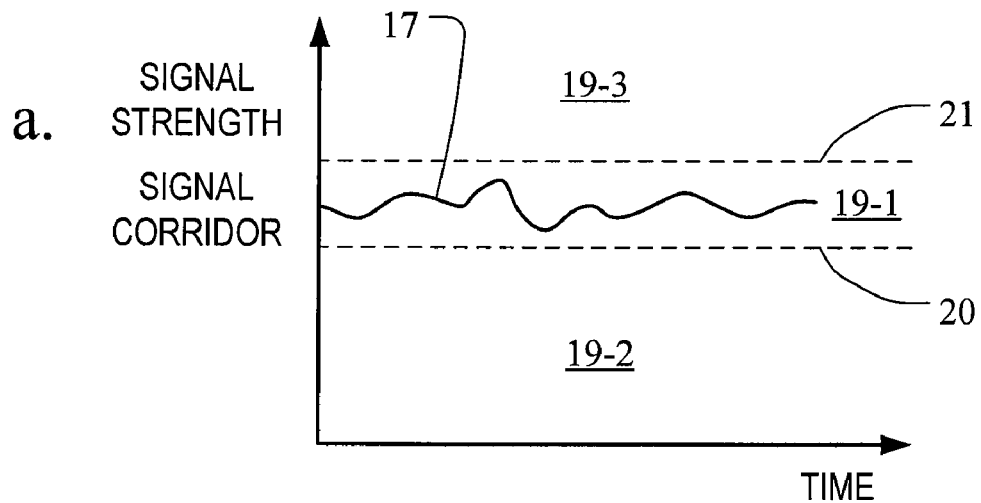
FIG. 3 shows schematic signal diagrams illustrating exemplary output signals of the sensor device of FIG. 2 in accordance with the driver's position illustrated in FIG. 2.
Figure 3:
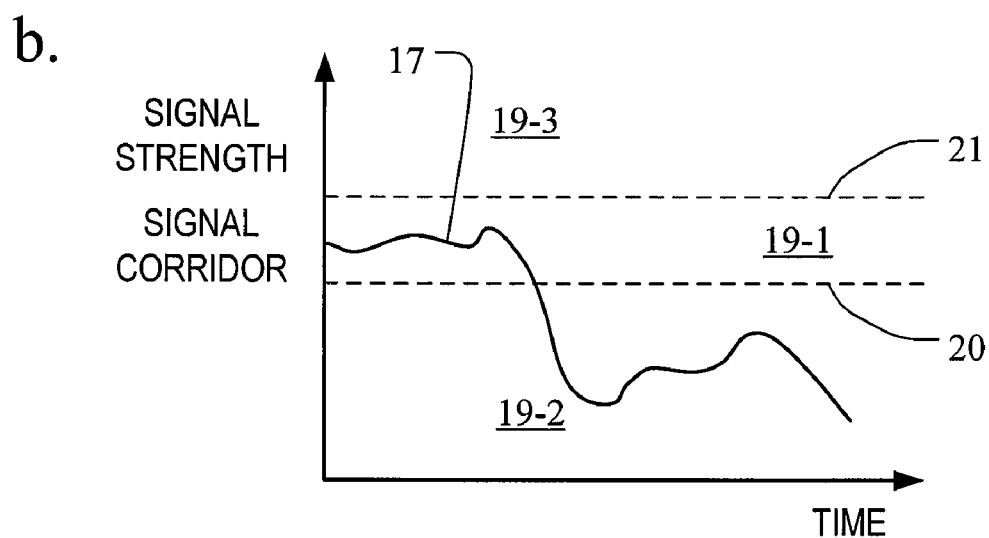

FIG. 3 depicts schematic signal diagrams illustrating exemplary output signals 17 from the sensor device 13 as shown in FIG. 1 in accordance with the driver's position illustrated in FIG. 2. The signal of FIG. 3a corresponds with the situation in FIG. 2a, and the signal of FIG. 3b corresponds with the situation in FIG. 2b. The sensor device 13 generates the output signal 17 responsive to the degree of reflection of the beam 15 reflected by the driver 3 as shown in FIGS. 2 and 3. For instance, the output signal 17 may be indicative of the radiation intensity of the reflected beam or beams. However, any other characteristic of a reflected beam may be used which is indicative of the degree of reflection of a beam emitted by the infra-red emitting device 12. Depending on the state of reflection, the signal strength of the output signal 17 varies. In the present example, with the degree of reflection, i.e., with the intensity of reflected radiation, the signal strength of the output signal 17 changes accordingly.

The control device 11 further defines at least one predetermined value such as a critical level 20 defining a range 19-1 above and a range 19-2 below the critical level 20, as shown in FIG. 3. The value 20 may be in principle any appropriate value for distinguishing between a first reflection state and another reflection state. When receiving the output signal 17, the control device 11 determines whether the output signal corresponds with a first value which is on one side of, in the present example higher than, the critical level 20. In other words, the control device 11 determines whether the output signal 17 corresponds with a first value in the range 19-1 above the critical level 20. Such an output signal 17 is indicative of a first position of the driver 3 as shown in FIG. 2a, denoted as a normal position 5 of the driver. In this position, the degree of reflection is rather high (the output signal 17 is above critical level 20) so that the control device 11 determines that the driver 3 is in the normal position when driving the vehicle. In this, situation, the dual view mode of the display device 14 may be maintained.

On the other hand, as shown in FIG. 2b, if the driver 3 leans over in the direction towards the passenger 4, the degree of reflection decreases significantly, so that the signal strength of the output signal 17 decreases below the critical level 20 into the range 19-2 below the critical level 20. This situation is indicative of a second position 6 of the driver 3, which is characterized as a dangerous behavior of the driver 3 when leaning over towards the passenger 4. Such leaning may be caused by the motivation of the driver 3 to watch the contents of the viewing region 142 on the display device 14.

In a further embodiment, another critical level 21 and a range 19-3 above the critical level 21 may be defined for discriminating when the driver is leaning forward or holds his or her hand in front of the sensor, having the effect that the sensor beam reflection increases. In such an event, when the output signal 17 is in the range 19-3, similar countermeasures may be taken as described above with reference to critical level 20. In this case, the control device 11 defines at least one corridor of values (range 19-1) and determines whether the output signal 17 is within the corridor of values 19-1, particularly defining the driver's normal position, or whether the output signal 17 is within ranges 19-2 or 19-3 below or above the corridor, indicating that the driver is leaving his or her normal position.

When the control device 11 determines that the signal strength of the output signal 17 decreases below the critical level 20, as shown in FIG. 3b which corresponds with the situation as shown in FIG. 2b, the control device 11 generates a corresponding control signal 18 for switching off or changing the multiple view function of the display device 14, so that the driver 3 is no longer motivated to lean towards the passenger 4. For example, the respective image or stream of images (in the case of displaying a movie or the like on the display screen) in the viewing region 142 may be changed to the view as displayed in viewing region 141, so that the views displayed in the viewing regions 141, 142 are substantially the same. This may be an appropriate countermeasure for causing the driver 3 to return to the normal position 5 as shown in FIG. 2a. Another action activated by the control device 11 may be switching the view in the viewing region 142 to an idle image, for example displaying an image of a single color, or the view in the viewing region 142 may be switched off showing a blank screen. Another action activated by the control device 11 may be to display a single view image in a common viewing region 143 as shown in FIG. 2b.

According to an embodiment of the invention, the measurements taken by the reflective infra-red sensor apparatus 12, 13 may be performed at random intervals so that the driver 3 cannot anticipate the measuring intervals. As shown in FIG. 2a in connection with FIG. 3a, the control device may define, based on the measured "normal" levels of reflection, a "normal position" (range 19-1 of normal reflection levels) of the driver, wherein the dual view function is available in this normal state. Should the driver 3 lean over, as shown in FIG. 2b, trying to watch the passenger's display contents, the reflection level will change significantly, so that the signal strength of the output signal 17 falls below the critical level 20, thus activating the control device 11 to change or switch off the dual view function of the display device. In this way, the invention may positively influence the driver's behavior to decrease his or her motivation to lean towards the passenger, thus increasing safety when driving the vehicle.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An on-vehicle position detection system, comprising:
   a radiation emitting device for producing at least one beam which is appropriate to be reflected by a human body seated in the vehicle;
   a sensor device configured for detecting reflection of the at least one beam produced by the radiation emitting device and reflected by the human body including the torso, and for generating an output signal responsive to a reflection state of the at least one beam; and
   a control device coupled with the sensor device, the control device configured for receiving the output signal from the sensor device, and for determining whether the output signal corresponds with a first value indicative of a first position of the human body including the torso, or a second value which is different from the first value;
   wherein the control device is further configured for generating a control signal that is provided to a display device, the display device having an operation mode that includes simultaneously displaying a first view in a first viewing region of a display screen and a second view in a second viewing region of the display screen, wherein the control signal is adapted for switching on, switching off, or changing at least one of the functions of the operation mode when the control device determines that the output signal corresponds with the second value,
   wherein the first position corresponds to a normal position of the human body including the torso relative to the display device, and the second value corresponds to a position that deviates from the normal position by a predetermined amount.

2. The on-vehicle position detection system according to claim 1, wherein the radiation emitting device produces at least one infra-red beam.

3. The on-vehicle position detection system according to claim 1, wherein the sensor device includes at least one photo sensor for detecting at least one reflected beam produced by the radiation emitting device.

4. The on-vehicle position detection system according to claim 1, wherein the control device is configured for changing at least one of the first and second views such that the at least one of the first and second views is switched to an idle image.

5. The on-vehicle position detection system according to claim 1, wherein the control device is configured for changing at least one of the first and second views such that the first and second views are made to be substantially the same.

6. The on-vehicle position detection system according to claim 1, wherein:
   the sensor device is configured for generating the output signal responsive to the degree of reflection of the at least one beam; and
   the control device defines at least one predetermined value and determines whether the output signal is below or above the predetermined value.

7. The on-vehicle position detection system according to claim 1, wherein the radiation emitting device produces the at least one beam discontinuously at random time intervals.

8. The on-vehicle position detection system according to claim 1, wherein:
   the radiation emitting device is configured for directing the at least one beam towards a driver's seat of the vehicle; and
   the sensor device is configured for detecting a reflection of the at least one beam reflected by the driver's body including the torso.

9. The on-vehicle position detection system according to claim 8, wherein:
   the operation mode of the display device includes a multiple view function for displaying multiple views at the same time on the display device; and
   the control device is configured for determining whether the output signal corresponds with a first value indicative of a first driver's position of a driver, or a second value indicative of a second driver's position of the driver that is different from the first driver's position;
   wherein the control device is further configured for switching off or changing the multiple view function when the control device determines that the output signal corresponds with the second value.

10. An on-vehicle position detection method, comprising:
    producing at least one beam which is appropriate to be reflected by a human body including a torso seated in the vehicle;
    detecting a reflection of the at least one beam reflected by the human body including the torso and generating an output signal responsive to a reflection state of the at least one beam;
    receiving the output signal and determining whether the output signal corresponds with a first value indicative of a first position of the human body including the torso, or a second value which is different from the first value; and
    generating a control signal that is provided to a display device, the display device having an operation mode that includes simultaneously displaying a first view in a first viewing region of a display screen and a second view in a second viewing region of the display screen, wherein the control signal is adapted for switching on, switching off, or changing at least one of the functions of the operation mode when it is determined that the output signal corresponds with the second value;
    wherein the first position corresponds to a normal position of the human body including the torso relative to the display device, and the second value corresponds to a position that deviates from the normal position by a predetermined amount.

11. The on-vehicle position detection method according to claim 10, wherein the at least one beam comprises an infra-red beam.

12. The on-vehicle position detection method according to claim 10, wherein at least one photo sensor is used for detecting at least one reflected beam.

13. The on-vehicle position detection method according to claim 10, wherein at least one of the first and second views is switched to an idle image.

14. The on-vehicle position detection method according to claim 10, wherein the first and second views are made to be substantially the same.

15. The on-vehicle position detection method according to claim 10, wherein:
    the output signal is responsive to at least the degree of reflection of the at least one beam; and
    it is determined whether the output signal is below or above a predetermined value.

16. The on-vehicle position detection method according to claim 10, wherein the at least one beam is produced discontinuously at random time intervals.

17. The on-vehicle position detection method according to claim 10, wherein:

the at least one beam is directed towards a driver's seat of the vehicle, and the method further comprises detecting a reflection of the at least one beam reflected by the driver's body including the torso.

18. The on-vehicle position detection method according to claim 17, wherein the operation mode of the display device includes a multiple view function for displaying multiple views at the same time on the display device, the method further comprising:

determining whether the output signal corresponds with a first value indicative of a first driver's position of a driver, or a second value indicative of a second driver's position of the driver that is different from the first driver's position; and switching off or changing the multiple view function when it is determined that the output signal corresponds with the second value.

19. The on-vehicle position detection system according to claim 9, wherein the first view is positioned on the display screen nearer the driver and the second view is positioned on the display screen nearer a passenger seat, and wherein the driver's body is leaning toward the passenger seat in the second driver's position.

20. The on-vehicle position detection method according to claim 18, wherein the first view is positioned on the display screen nearer the driver and the second view is positioned on the display screen nearer a passenger seat, and wherein the driver's body is leaning toward the passenger seat in the second driver's position.

* * * * *